April 4, 1961  J. C. LARSON  2,978,210
AUTOMATIC PILOTS
Filed Oct. 28, 1955  2 Sheets-Sheet 1
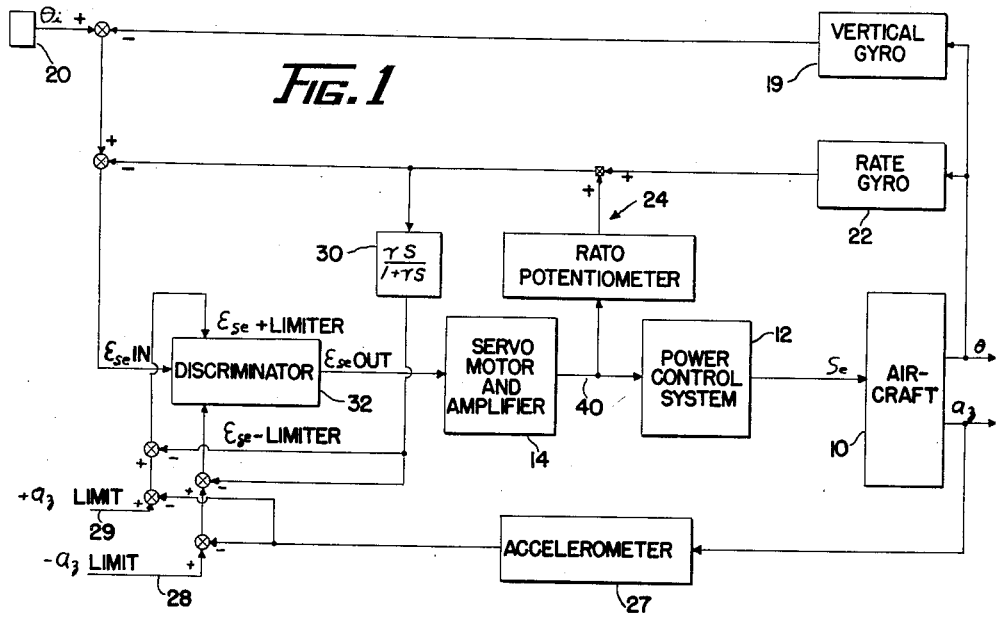
ACTION OF DISCRIMINATOR
$\varepsilon_{se}$ IN IS LIMITED TO VALUES BETWEEN $\varepsilon_{se}$ (+LIMITER) AND $\varepsilon_{se}$(-LIMITER).
THE LIMITER ERROR SIGNALS MAY TAKE ON EITHER POSITIVE OR NEGATIVE VALUES.
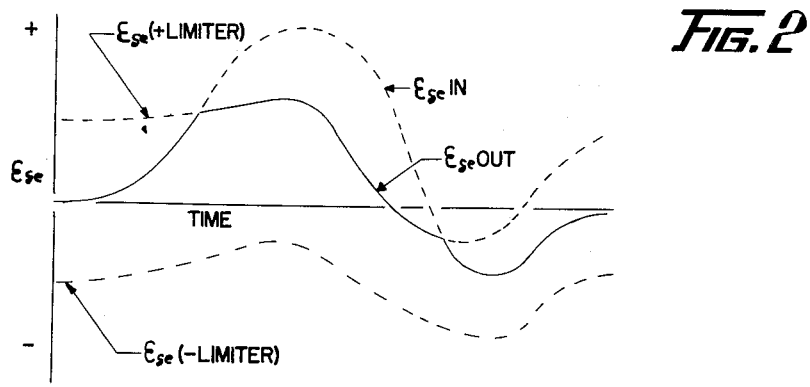
INVENTOR.
JOHN C. LARSON
BY *Gordon Reed*
ATTORNEY

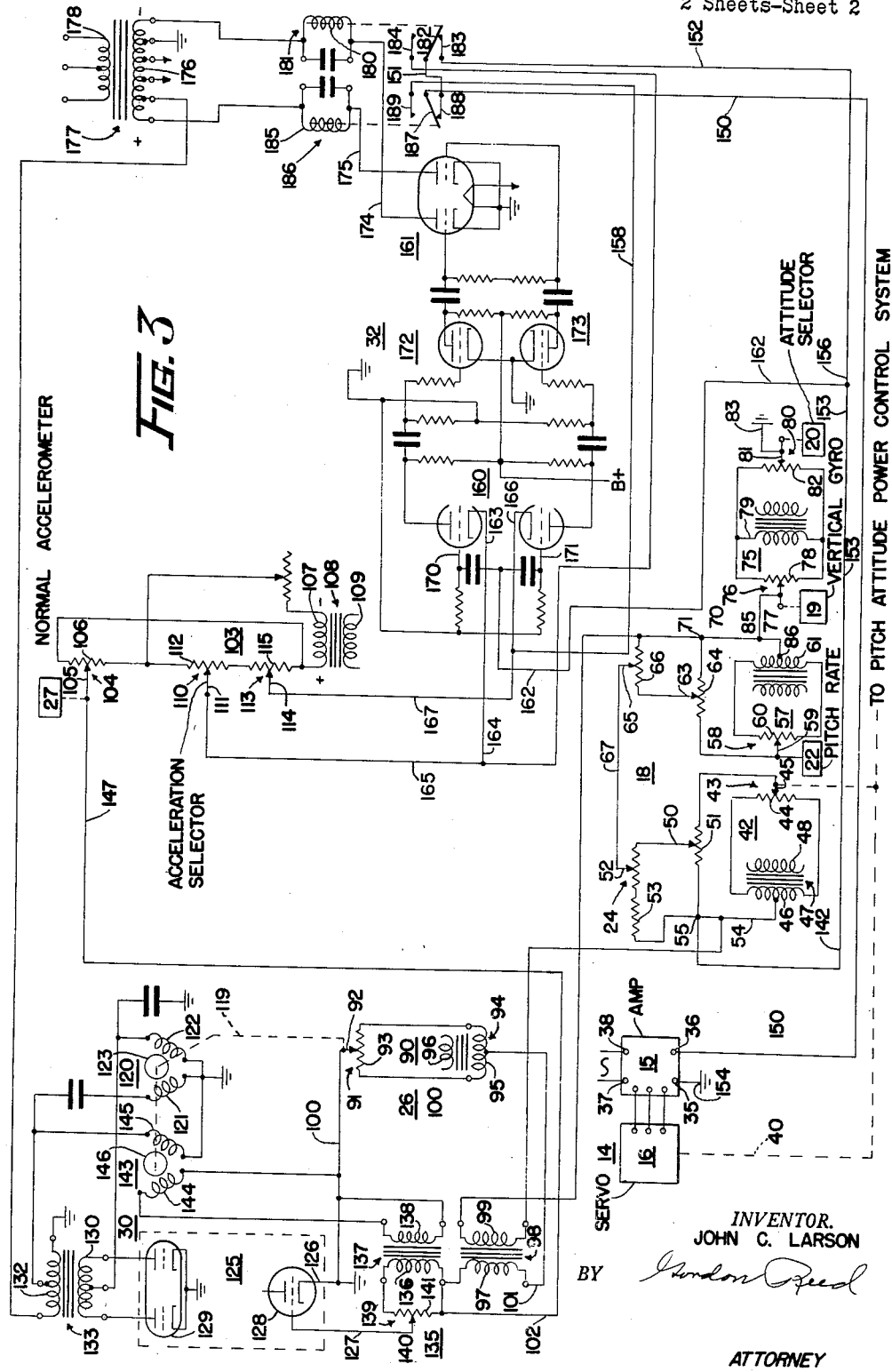

United States Patent Office 2,978,210
Patented Apr. 4, 1961

2,978,210

AUTOMATIC PILOTS

John C. Larson, Minneapolis, Minn., assignor to Minneapolis-Honeywell Regulator Company, Minneapolis, Minn., a corporation of Delaware Filed Oct. 28, 1955, Ser. No. 543,367

22 Claims. (Cl. 244—77)

This invention relates to automatic condition control systems wherein a condition may be maintained at a predetermined value and wherein selectively operable means effects a change in the magnitude at which the condition is to be stabilized. Such condition may be stabilized by a condition controlling device responsive to a condition change responsive means.

During the stabilizing of the condition, by the condition change responsive means and the condition controlling device, the gain or sensitivity of the condition control system may be such that the positioning of the condition control device may result in exceeding the capacity, in some form, of the system being responsive to the controlling device to return to the desired condition. Consequently it may be necessary to limit the operation of the controlling device so that the capacity of the system in the particular aspect involved as it restores the condition to the predetermined value is not exceeded.

The invention is readily applicable to automatic condition control systems such as automatic pilots for aircraft or other dirigible craft. In particular the invention may be applied to controlling the craft about its lateral or pitch axis. In such control system, craft condition responsive devices may control pitch attitude changing means which cause a reaction on the craft to restore the craft to a desired condition. If the condition controlling device is positioned a large amount for a slight departure of the condition from a desired value, indicating a high gain system, the reaction on the craft due to the displaced controlling device may result in overstressing the craft. Consequently, the controlling device sholuld be so positioned as to prevent such overstressing of the craft.

One object of this invention is to compare the magnitude of a usual control signal such as a condition stabilizing signal which causes operation of a condition controlling device to maintain a condition with the magnitude of a monitoring signal resulting from the reaction of a controlled device being stabilized to such operated condition controlling device wherein the reaction is a measure of the safe operation of the controlled device and rendering said usual control signal ineffective to operate said controlling device when the difference between the compared signals reaches a predetermined magnitude.

A further object of the invention is to compare the magnitude of a first control signal which causes operation of a condition controlling device for example to stabilize a condition with the magnitude of another or limiting signal resulting from the response of sensing devices of the system being controlled to effects on the system of such operated condition controlling device, said limiting signal being indicative of the safe operation of the system and rendering said first control signal ineffective and said other or limiting signal effective to operate said controlling device when the difference in magnitude between the compared signals reaches a predetermined magnitude.

A further object of the invention is to compare a resultant control signal which causes operation of a pitch attitude controlling device for an aircraft with another computed signal in which the latter arises from, a selected maximum normal acceleration of the craft, the actual normal acceleration of the craft resulting at least in part from the response of the craft to such operated condition controlling device, and also from a combined craft pitch rate and controlling device displacement both as modified by a quantity or phase shifting factor $$\frac{J\omega T}{1+J\omega T} \text{ or } \frac{TS}{1+TS}$$

varying with frequency which modification could be obtained if electrical signals are used by passing them through a high pass condenser-resistor circuit.

The above and further objects of the invention may more readily appear upon consideration of the following description had in conjunction with accompanying drawings a preferred embodiment of the invention.

In the drawings:

Figure 1 is a block diagram of the invention embodied in an aircraft pitch attitude control system, Figure 2 shows in graphic form the operation of the invention in the system, and Figure 3 comprises an application of the invention in an electrical schematic of a portion of the pitch attitude control system but omitting the power control system of Figure 1 which comprises actually part of the aircraft.

Referring to Figure 1, an aircraft 10 includes an operable device (not shown) for controlling the pitch attitude ($\theta$) of the craft. The operable device is positioned by a power control system 12 which may be normally considered an integral part of the craft. This power control system generally may be manually controlled as well as automatically controlled. The automatic control of the power control system is provided by a servomotor-amplifier combination 14. For reasons which will be more fully considered, the servomotor-amplifier combination is controlled by two control circuits 18, 26. One control circuit 18 normally controls the servomotor-amplifier combination 14 to maintain the craft in a given attitude or to effect changes in attitude under a desired control. The control circuit 18 includes a vertical gyroscope 19 for sensing craft pitch attitude, an attitude command change signal source 20 which may be an altimeter or manually operable controller; a rate gyro 22 for sensing craft pitch rate changes; and a servomotor feedback or servo position arrangement 24. The resultant signal derived from the operation of the various devices 19, 20, 22, and 24 control the servomotor-amplifier 14 and the power control system 12 to effect operation of the attitude controlling device of the aircraft which causes a change in attitude ($\theta$) of the craft from a present attitude. During such change in attitude, the aircraft will incur a "normal" acceleration which is along its Z or normally vertical or turn axis. If this "normal" acceleration is excessive the craft may be overstressed which would result in its destruction.

To prevent such overstressing, an alternative control circuit 26 will under certain conditions replace the control circuit 18 in control of the servomotor-amplifier combination 14. A limit "error" signal $$A_\text{L} - A_\text{z} - \theta \frac{TS}{1+TS} - \frac{TS}{1+TS}\delta_\text{e}$$

is computed from separate bridge circuitry. The terms of this expression are the limit normal acceleration permitted, the actual craft normal acceleration, high passed pitch rate, and high passed elevator deflection, in the order of recitation. This error signal is of such a nature that if the airplane were controlled by it, its response would be that corresponding to a called-for step of normal acceleration of a magnitude equal to the limit load factor of the airplane. This limit error signal in control circuit 26 is compared with the normally controlling pitch attitude error signal, in control circuit 18 and the signal calling for the least up elevator is fed into the amplifier. The autopilot amplifier error signal is permitted to vary so that it stays between two computed signals called limiting elevator error signals. One of these computed signals is the error signal from a normal acceleration autopilot type bridge circuit biased so that the positive or upward desired limit normal acceleration $A_L$ is called for. The other signal is biased so that the negative limit desired normal acceleration or downward acceleration $A_1$ is called for. The positive and negative limits may be made unequal and are so in general.

Actual normal acceleration and hi-passed pitch rate plus hi-passed elevator angle signals were used in computing the limiting elevator error signals. Expressed in equation form the limit elevator error signal is:

$$\epsilon\delta_e = (a_{z_L} - a_z) + \frac{TS}{1+TS}[-\dot\theta - \delta_e]$$

In the above expression $\epsilon\delta_e$ is the signal causing further elevator displacement; $a_{z_L}$ is the limit function signal selectively set; $a_z$ is the craft actual normal acceleration signal; $\dot\theta$ is the craft pitch rate signal; $\delta_e$ is the existing elevator displacement signal. The term hi-passed means that steady state values of the signals are not utilized. The gain constants for these terms have been omitted. The control circuit 26 includes an accelerometer 27 for sensing linear acceleration in the direction of the turn axis, and coacting therewith are a "minus" normal acceleration limit control 28 and a "positive" normal acceleration limit control 29. Also included in circuit 26 is a further controlled or high pass device 30 which is responsive to the operation of rate gyro 22 and the operation of the servo position feedback device 24.

The control signals from the two circuits 18 and 26 are applied to a comparing device or discriminator 32. When there exists a predetermined difference between the control signals developed by the two circuits 18 and 26, the control circuit 18 which is normally effective to control the servo-motor-amplifier 14 is rendered ineffective to control it. Instead, the control circuit 26 becomes effective to control the servomotor-amplifier 14. By the substitution of the control circuit 26 for the circuit 18, the control signal applied to the servomotor-amplifier is limited in magnitude, and the consequent operation of the control device is also limited to prevent overstressing of the aircraft 10. By the substitution of control circuit 26 for control circuit 18, the servomotor-amplifier 14 in effect is responsive to what may be considered a "normal" acceleration autopilot control.

The control equation defining the error signal for this normal accelerometer control is:

$$\epsilon\delta_e = A_L - A_z - \frac{TS}{1+TS}(\dot\theta + \delta_e)$$

with gain constants from the terms $\dot\theta$, $A_z$, $\delta_e$ omitted. In the above equation, $\dot\theta$ is the craft pitch rate, $A_z$ is the craft normal acceleration, T equals the reciprocal of the integrator gain factor, S is the conventional operator equals $J\omega$ in sinusoidal vibration, and $\delta_e$ is the incremental elevator deflection permitted.

Referring to Figure 3, the servomotor-amplifier 14 comprises an A.C. discriminator amplifier 15 for reversibly controlling a servomotor 16. The servomotor-amplifier combination may be similar to that disclosed in Patent No. 2,425,734 to Willis H. Gille et al. dated August 19, 1947. Briefly, the amplifier 15 comprises a pair of A.C. signal voltage input terminals 35, 36 and A.C. power input terminals 37, 38. The motor 16 includes a pair of brake windings and a pair of clutch windings. Depending upon the phase relationship of the A.C. signal voltage across terminals 35, 36 with respect to the voltage across terminals 37, 38, one or the other of the motor clutch windings is energized. By operation of the motor clutch winding, motion is transmitted to an output member 40 which controls the power control system 12 of Figure 1 and the servo position arrangement 24. The extent of displacement of output member 40 per unit of time is proportional generally to the magnitude of the amplifier control signal voltage.

Signals supplied to the amplifier terminals 35, 36 are normally derived from a balanceable signal voltage network 18. The network 18 comprises a servomotor-amplifier balance network 42, a craft pitch rate network 57, and a vertical gyro-pitch command network 75. Network 42 comprises a servomotor operated potentiometer 43 having a resistor 44 and slider 45; a transformer 47 having a primary winding 48 and a secondary winding 46; an elevator ratio potentiometer having an adjustable tap 50 and resistor 51; and an elevator ratio compensation potentiometer having an adjustable tap 52 and resistor 53. The resistor 44 is connected across the secondary winding 46. The slider 45 is positioned along resistor 44 with respect to the electrical center thereof having a potential corresponding with the center of winding 46 by an operating means 40 of the servomotor 16. The secondary winding 46 has a center tap connection 54 extending to a terminal 55. The elevator ratio potentiometer has its resistor 51 connected between junction 55 and slider 45. Resistor 53 is connected between junction point 55 and adjustable tap 50.

Network 57 comprises a pitch rate potentiometer 58 having an adjustable slider 59 and resistor 60; a secondary winding 61 of the transformer 47; a pitch rate adjustment potentiometer having an adjustable slider 63 and resistor 64; and a pitch rate compensation potentiometer having an adjustable tap 65 and resistor 66. Potentiometer resistor 60 is connected across the secondary winding 61 having a center tap 86. Slider 59 is adjusted along resistor 60 in either direction from the electrical center thereof having a potential corresponding with the secondary winding center tap 86. The adjustment of slider 59 is effected through the pitch rate gyroscope 22. The pitch rate adjustment potentiometer has its resistor 64 connected across the center tap 86 and adjustable slider 59. The pitch rate compensation potentiometer has its resistor 66 connected across adjustable tap 63 and the center tap 86 of secondary winding 61. A conductor 67 connects the adjustable tap 65 to the adjustable tap 52. The output of the two networks 42 and 57 which are connected in electrical series is obtained across the terminal 55 and the center tap 86 of secondary winding 61.

In series with network 57 is the network 75 in the form of a Wheatstone bridge. It comprises the vertical gyro pitch attitude potentiometer 76 having an adjustable slider 77 and resistor 78, a secondary winding 79 of the transformer 47, and a control potentiometer 80 having an adjustable slider 81 and resistor 82. The resistor 78 is connected across the secondary winding 79. Resistor 82 is connected in parallel with resistor 78 across the secondary winding 79. Sliders 77 and 81 are normally at the electrical centers of their respective resistors at which time their potentials are the same. Slider 77 may be operated in either direction from the electrical center of resistor 78 by the vertical gyroscope 19 which senses the craft pitch attitude. Slider 81 may be positioned in either direction from the electrical center of resistor 82 by an operating means 20 such as an altimeter or manual controller. Slider 77 is connected to center tap 86 by conductor 85 and a ground conductor 83 extends from slider 81 thereby completing the balanceable network for amplifier 15.

The balanceable network 26 comprises a plurality of sources of series connected A.C. voltage signal generators 90, 97, and 103. Signal generator 90 has no substantial effect in short periods of aircraft response and servo displacement but does during long periods. As illustrated it is a potentiometer network comprising an integration potentiometer 91 having an adjustable slider 92 and resistor 93 which is connected across a secondary winding 95 of a transformer 94 having a primary winding 96. The secondary winding includes a center tap conductor 101; and slider 92, in normal position, is at the electrical center of resistor 93 having a potential corresponding with the center tap conductor 101. Signal generator 97 is a secondary winding of a transformer 98 having a primary winding 99 which is connected across the center tap 86 and junction 55 in network 18. Signal generator 103 is a normal acceleration network and comprises an accelerometer operated potentiometer 104 having a slider 105 and resistor 106 which is connected across a secondary winding 107 of a transformer 108 having a primary winding 109. The slider 105 is positioned from an accelerometer 27 which responds to the "normal" acceleration of the craft in the direction of its turn axis. Network 103 additionally includes two potentiometers 110, 113. Potentiometer 110 comprises a resistor 112 and an adjustable tap 111; potentiometer 113 comprises an adjustable tap 114 and resistor 115. The resistors 112 and 115 are connected in series and their combination is connected across the secondary winding 107 of the transformer 108. The slider or tap 111 is adjusted to set up a negative acceleration limit calibration and the slider 114 is adjusted to give a positive limit acceleration calibration where these two terms are related to directions along the craft turn axis.

Reverting to the signal generator 90, the slider 92 of potentiometer 91 as stated is identified as an integration potentiometer slider. The slider 92 is controlled by an operating means 119 extending from an integration motor 120. The motor 120 is of the capacitor type induction motor and includes a line energized winding 121 connected to an A.C. supply and an amplifier energized winding 122. The winding 122 is energized from a discriminator amplifier 125. The amplifier 125 comprises a voltage amplifier section 128 having a pair of signal input connections 126, 127. The amplifier 125 includes a discriminator section 129 energized from a secondary winding 130 of a transformer 133 having a primary winding 132. The line winding 121 of the motor is also energized from the primary winding 132. The arrangement is such that the line winding 121 is energized in a leading or lagging cycle relative to the energization of the amplifier winding 122. The phase relationship of the two energizations of the respective windings depends upon the phase relationship of the A.C. signal voltage supplied by conductors 126, 127 relative to the voltage across the secondary winding 130. Such combinations of capacitor type induction motor and A.C. discriminator amplifiers are old as evident from U.S. Patents Nos. 2,020,275 and 1,586,233.

The amplifier 125 derives control signals from a control circuit 135 comprising a secondary winding 136 of a transformer 137 having a primary winding 138. A voltage dividing potentiometer 139 includes an adjustable tap 140 and resistor 141 connected across the secondary winding 136. The adjustable tap 140 is connected to the amplifier input conductor 127. Included in the circuit 135 is the secondary winding 97 of transformer 98 and the network or signal generator 90. For example, the entire control circuit 135 in sequence comprises input connection 127, adjustable tap 140, resistor 141, secondary winding 97, conductor 101, signal generator 90, conductor 100, and grounded amplifier input conductor 126.

The transformer winding 138 is energized by a secondary winding 144 of a dynamic transformer or velocity signal generator 143. The signal generator 143 includes a primary winding 145 connected to winding 132 and a rotor 146 driven from the motor 120. The magnitude of the voltage induced in secondary winding 144 depends upon the rate of rotation of the rotor 146.

The signal generator or potentiometer network 90 is included both in the control circuit 135 of amplifier 125 and in the alternative balanceable network 26 of servomotor amplifier 15. When it is included in the network 26, the voltage developed between conductor 100 connected to slider 92 and the conductor 102 is equal to the sum of (the voltages derived from the servo balance network 42 and the pitch rate gyro network 57) ×

$$\frac{TS}{1+TS}$$

In the above expression T is the inverse of the gain factor A of the integrator 30, and S is the conventional mathematical operator. The gain factor (A) of the integrator which is the ratio of the rate of change of magnitude of the signal out to the magnitude of input signal to amplifier section 128, may be adjusted by moving tap 140 along resistor 141. The gain factor is defined as the rate in magnitude of the change of voltage from potentiometer 91 relative to the magnitude of the signal voltage on amplifier input connections 126, 127.

The apparatus which determines whether the network 18 or network 26 will control the autopilot servo amplifier 15 will now be considered. Included in the apparatus is a discriminator 32 or a voltage comparing device. The discriminator comprises a voltage amplifying section 160 and a relay operating discriminator section 161. The amplifier section comprises two channels having a common voltage signal applied to their input section control grids 170, 171 and a separate control voltage applied to the respective input cathodes 163, 166. One of the amplifier sections 172 controls the conduction in a plate circuit 174 of the discriminator 161. Another amplifier section 173 controls the conduction in a plate circuit 175 of discriminator 161. The plate circuits 174, 175 of discriminator 161 are connected respectively to opposed ends of a secondary winding 176 of a transformer 177 having a primary winding 178. Included in the plate circuit 174 is an operating winding 180 of a relay 181. Relay 181 includes an operable arm 182 which coacts without contact 183 and in contact 184. Included in plate circuit 175 is an operating winding 185 of a relay 186 which additionally includes an operable arm 187 that coacts with an out contact 188 and in contact 189.

Reverting to the amplifier section 160 it is noted that the input grids 170, 171 of each amplifier section 172, 173 are capacitor coupled to a common connection to a conductor 162 which is connected further through conductor 153 and conductor 142 to the series connected networks 42, 57, 75 whereby the normal or usual control signal for servo amplifier 15 is applied to the two grids 170, 171. The cathode input electrode 163 of amplifier section 172 is connected by conductors 164, 165 to slider or tap 111 of the negative limit calibration potentiometer 110. The cathode input electrode 166 of amplifier section 173 is connected by conductor 167 to slider 114 of the positive normal acceleration limit calibration potentiometer 113. A control voltage for cathode 163 is derived between slider 111 and the craft responsive accelerometer operated slider 105 whereas a control voltage signal for cathode 166 is obtained between slider 114 and the craft responsive normal accelerometer operated slider 105. Additionally, each cathode 163, 165 additionally includes a common branch circuit comprising conductor 147, transformer winding 97, conductor 101, potentiometer network 90, conductor 100, amplifier connection 126 to ground which is common to ground at conductor 83.

*Operation*

During normal flight operations when the servomotor 16 operates the power control system 12, Figure 1, and the servomotor 16 is controlled by the amplifier 15, the aircraft is stabilized in a given pitch attitude from networks 57, 75 which attitude may be altered as desired by controller 20. During such operation, the control circuit 18 for the amplifier 15 comprises amplifier terminal 36, conductor 150, relay arm 187, out contact 188, conductor 151, relay arm 182, out contact 183, conductor 152, conductor 153, conductor 142 and the series connected networks 42, 57, 75, ground conductor 83, amplifier ground conductor 154, amplifier terminal 35.

It will be noted that at the junction 156 of conductors 152, 153 the conductor 162 extends through capacitors to the two control elements 170, 171 of the discriminator 32. Thus the control signal which is applied to the control grids 35, 36 of amplifier 15 is also applied to the control grids 170, 171 of the discriminator 32. In fact, the control signal from the recited series connected networks is always applied to the control grids 170, 171 of the discriminator 32.

On the other hand, the control voltages for the input cathodes 163, 166 of discriminator 32 are derived from their respective common network 103, from the transformer winding 97, and from potentiometer network 90.

If the aircraft is in level flight attitude position and controller 20 is not ordering a change in attitude, we may assume that no control voltage is being supplied by the networks 42, 57, and 75. Considering network 103, with the aircraft not being accelerated along its vertical axis, the slider 105 is at the electrical center of resistor 106. In this position of slider 105, and with the slider 114 adjusted to some positive normal acceleration limit, and with the instantaneous voltages as shown on winding 107 the slider 114 will be positive with respect to slider 105, consequently the cathode 166 is positive with respect to its related grid 171. At this time the plate circuit 175 may be connected to the positive end of the secondary winding 176. Also in network 103, with the slider 111 adjusted to a negative normal acceleration limit, the slider 111 will be negative relative to the accelerometer operated slider 105, consequently cathode 163 will be negative relative to its related grid 170 and the plate circuit 174 will be connected to the negative side of transformer winding 176 at the instant under consideration. With the plate circuit 174 connected to the negative side of transformer secondary 176, this circuit will be nonconducting. Since cathode 166 is positive relative to its grid 171, the plate circuit 175 also will not be conducting even though it is connected to the positive side, in the instant under consideration, of secondary winding 176.

If a command signal is applied to network 75 by the operating means 20 for slider 81 the control circuit on amplifier 15 will be unbalanced which will result in the operation of the servomotor 16 and the resultant operation of the attitude control means of the craft. We may assume that the operation of the attitude changing means causes the craft to accelerate in such a direction that accelerometer 27 adjusts its slider 105 toward the upper end in Figure 3 of resistor 106. By this adjustment of slider 104, it is apparent that the positive voltage between sliders 114 and 105, in the instant under consideration, will reduce the positive voltage of cathode 166 relative to its related grid 171. It is conceivable that the slider 105 may be adjusted to such an extent that the cathode 166 becomes negative relative to its related grid 171. When this occurs, the plate circuit 175 becomes conducting and relay 186 is closed causing relay arm 187 to engage contact 189.

With relay arm 187 engaged with contact 189 the control circuit 18 is no longer connected to the servo amplifier 15. Instead, the control circuit 26 beginning from conductor 100 connected to grounded amplifier connection 126 continuing to signal generator 90, conductor 101, winding 97 conductors 102, 147, potentiometers 104, 113, conductors 167, and to cathode 166 is connected by conductor 158, relay in contact 189, relay arm 187, conductor 150, to the amplifier terminals 36, 35 of amplifier 15.

With the operation of relay 186 as described, the control of the servomotor 16 from amplifier 15 is provided by the control circuit 26 which will result in the operation of the servomotor and consequent operation of the pitch attitude controlling means of the craft whereby the control surface may be operated to prevent the normal acceleration of the craft to exceed the desired limit. When the pitch attitude signal from network 18 decreases to a value more negative than that from circuit 26, the amplifier section 173 will become nonconducting. The relay 186 with its winding no longer energized will move to its out position. With the relay in the out position, the control circuit network 18 will be restored to the control of amplifier 15.

As evident from the phasing arrangement of transformer 98, and concerning control circuit 26 during the short period or transient maneuvers of the craft the pitch rate gyro effect along with the servomotor balance effect which is obtained across network terminals 55, 71, are not offset by any opposing voltage from network 90. It is also evident that during long periods of maneuvers or steady state conditions, network 90 will balance or cancel in network 26 any signals in transformer winding 97 due to craft rate of attitude change or control system displacement obtained from networks 57 and 42. The effective signal in circuit 26 is represented mathematically by Equation 1. The effective signal in circuit 26 is computed; it defines the dynamic response of the aircraft to the aforementioned step input. The terms $A_z$, $\theta$, $\delta_e$, in transients, due to a control input do not appreciably exceed in combination the preset normal acceleration, $A_L$. If circuit 26 controls amplifier 15 and if $A_L$ be exceeded the operation of control system 12 will be reversed to decrease $A_z$.

If the command or control signal mentioned above causes a positive acceleration of the craft, the accelerometer 27 will move slider 105 upwardly and this along with the rate gyro and servo displacement effects serve to decrease the positive signal on cathode 166. Assuming the vacuum tube which includes cathode 166 to have been biased to cutoff, if we assume a constant command signal from circuit 18 on the grid 171 of this amplifier input section and consider that the positive voltage on cathode 166 is decreasing, it is readily apparent that the grid will become sufficiently positive with respect to the cathode 166 as to cause the tube to conduct which results in the operation of the relay 186.

Alternatively, if the command signal controller 20 is adjusted to move slider 81 in the opposite direction from its electrical center, a negative acceleration will be given to the craft. Assuming as before that a short time period is involved, the voltage of each circuit 18, 26 is applied to the cathode and grid elements of the discriminator 32. The acceleration of the craft will cause the accelerometer 27 to move the slider 105 downwardly in Figure 3. This reduces the voltage on cathode 163 relative to the voltage from the command signal controller 20 on the grid 170 of its related input tube. When there is a phase reversal of the A.C. voltage, the grid 170 will become positive relative to the cathode 163 which will result in a conduction in plate circuit 174 causing the operation of the relay 181.

It is evident that when the selectively adjustable sliders 111 and 114 which represent $A_L$ in Equation 1 are moved to the ends of their respective resistors 112, 115 nearest connections to the ends of the transformer secondary winding 107, that a large voltage is placed by the accelerometer network 103 on the respective cathodes 163, 166 so that a greater operation of the accelerometer 27 and its slider 105 will be necessary to reduce the voltage on the cathodes 163, 166 so that their respective amplifier sections 172, 173 become operative. Sliders 111, 114 may be adjusted manually or automatically in response to the weight of the craft, airspeed, altitude, and/or dynamic pressure acting on the craft.

During steady state or long period maneuvers of the craft, the voltage in transformer secondary 97 from both the servo balance network 42 and the pitch rate gyro network 57 is opposed by the voltage from the integrator potentiometer network 90. Consequently, greater displacement of the accelerometer slider 105 by the normal accelerometer 27 may be required before the input tubes of amplifier sections 172 or 173, as the case may be, become effective to cause conduction in the plate circuits 174 or 175.

In general a comparison is made between the usual bridge signal from circuit 18 and the derived signal from circuit 26. This is desirable in order to obtain bumpless aircraft response when changing from one bridge to the other in controlling amplifier 15. The derived signal from circuit 26 assures that the preset normal acceleration $A_L$ will not be exceeded. On comparing the signals, the one calling for less attitude increase controls amplifier 15.

Figure 2 is a graphical illustration of how the control circuit for the servo amplifier shifts from control network 18 to network 26 and then returns to network 18. In the graph, the solid line indicates the control of the amplifier 15. In the history of the operation of discriminator 32 time is assumed to increase as the rightward distance is increased. The graph indicates that when the network 18 is positive relative to network 26 that network 26 will control the autopilot amplifier 15 and conversely when network 18 is negative with respect to the network 26 that network 18 will control the autopilot amplifier.

It will now be apparent that I have provided a novel command signal limiting system for controlling a servomotor amplifier wherein the signal limiting system responds to the difference between a first or usual attitude or flight path control signal and a second signal. The second signal is derived from functions of craft normal acceleration and a combined function of craft pitch rate and servo displacement. The system is thus effective whereby the first signal is made ineffective and the second effective to control the amplifier. When the second signal assumes control the stress on the structural frame work of the aircraft will not be permitted to exceed a selected predetermined limit.

While I have shown the normal acceleration of the craft as a controlling factor in an embodiment of the invention, it is contemplated that other factors such as angle of attack of the craft may be substituted in network 103 and the craft would be controlled so as not to exceed this factor.

What is claimed is:

1. Control apparatus for a dirigible craft having an operable means for controlling longtiudinal attitude thereof, comprising: servo means positioning said operable means and effecting a normal acceleration of said craft; a balanceable control circuit normally controlling said servo means including sources of control signals; signal generating means responsive to the normal acceleration of said craft; means connected to the control circuit and signal generating means for comparing the outputs of said signal generating means and balanceable control circuit; and further means responsive to said comparing means upon a predetermined difference of said control signals and output of the signal generating means for rendering the balanceable control circuit ineffective and the signal generating means effective to control said servo means, to limit the signal applied by said control circuit to said servo means.

2. Control apparatus for a dirigible craft having an operable means for controlling attitude thereof about one axis, comprising: servo means positioning said operable means and effecting attitude changes and normal accelerations of said craft; signal means normally providing a control signal for said servo means and responsive to the attitude of the craft about said axis, the rate of change of attitude of the craft about said axis, and the displacement of said servo means; a signal generator responsive to the normal acceleration of said craft in the direction of its turn axis; means connected to the signal means and signal generator for comparing the output of said signal generator and signal means; and further means responsive to said comparing means upon a predetermined differential between said compared signals for rendering the signal means ineffective and the signal generator effective to control said servo means, to limit the normal acceleration of said craft.

3. Control apparatus for a dirigible craft having an operable means for controlling pitch attitude thereof, comprising: servo means positioning said operable means; a signal providing means providing a voltage signal variable with its adjustment and normally connected to said servo means to effect operation of said operable means; means comprising a second source of variable magnitude control voltage normally disconnected from said servo means; comparing means responsive to said two control voltages; and means responsive to a predetermined differential in said two control voltages for disconnecting the first source of voltage and connecting the second source of voltage to said servo means.

4. Control apparatus having operable means for controlling a first condition comprising: servo means positioning said operable means; a first source of control signal variable in magnitude normally controlling said servo means; a second source of variable control signal derived from a second condition related to said first condition and normally disconnected from said servo means; comparing means responsive to both signals; and means controlled by said comparing means upon a predetermined differential of said two control signals for rendering the first control signal ineffective and the second control signal effective to control said servo systems.

5. Control apparatus for a dirigible craft having operable means for controlling craft attitude about the lateral axis thereof, comprising: servo means positioning said operable means; a first source of control signal variable in magnitude in accordance with the craft pitch attitude, with the servo means position, and with the craft pitch rate and normally controlling said servo means; a second source of variable control signal derived from the normal acceleration of the craft and normally disconnected from said servo means; comparing means connected to the first and second source and responsive to both sources of signals; and means controlled by said comparing means upon a predetermined signal differential of said two sources of control signals for rendering the first source of control signal ineffective and the second source of control signal effective to control said servo means.

6. Control apparatus for an aircraft having a control surface for controlling craft pitch attitude, comprising: servo means positioning said control surface; a first source of control signal variable in magnitude in accordance with the craft pitch rate and a function of the operation of said servo means and normally controlling said servo means; a second source of variable control signal normally disconnected from said servo means; time delay means responsive to said pitch rate signal and said servo operation function signal for providing said second signal; comparing means responsive to both signals; and switching means controlled by said two control signals for disconnecting the first control signal and connecting the second control signal to said servo means.

7. Control apparatus for a dirigible craft having operable means for controlling craft pitch attitude, comprising: servo means positioning said operable means; a first source of control signal voltage, variable in magnitude in accordance with the craft pitch rate and a function of the operation of said servo means, normally controlling said servo means; a second source of variable control signal normally disconnected from said servo means; means responsive to the normal acceleration of said craft along its turn axis and time delay means responsive to said craft pitch rate and function of operation of said servo means for providing said second signal; comparing means responsive to said first and second signals; and means controlled by said comparing means upon a predetermined differential of said two control signals for rendering the first control signal ineffective and the second control signal effective to control said servo means.

8. Control apparatus for a dirigible craft having operable means for controlling craft attitude about an axis thereof, comprising: motor means positioning said operable means; a first source of control signal variable in magnitude normally controlling said motor means; a second source of variable control signal responsive to a condition of the craft due to operation of said servo means and normally disconnected from said servo means; further means responsive to said first and second signals upon a predetermined differential of said two control signals for rendering the first control signal ineffective and the second control signal effective to control said servo means.

9. Control apparatus for a dirigible craft having operable means for controlling craft attitude about an axis thereof, comprising: servo means positioning said operable means to change craft attitude; a first source of control signal variable in magnitude; thermionic means normally interconnecting said first source of signal and said servo means; a second source of variable control signal derived from a condition of the craft resulting from change in attitude; means connecting said first and second sources of control signals to said thermionic means whereby upon a predetermined differential of signal from said sources of two control signals the thermionic means renders the first control signal source ineffective and the second control signal source effective to control said servo means.

10. Control apparatus for an aircraft having an elevator control surface for controlling craft pitch attitude comprising: servo means positioning said control surface; a first source of control effect variable in magnitude normally controlling said servo means; a second source of control effect variable in magnitude and responsive to a condition of the craft and normally disconnected from said servo means; means controlled by said two control effects and operable upon a predetermined differential of said two control effects for rendering the first control effect ineffective and the second control effect effective to control said servo means.

11. Control apparatus for an aircraft having an elevator control surface for controlling craft pitch attitude, said apparatus comprising: servo means positioning said operable means; a first source of control effect variable in magnitude normally controlling said servo means; a second source of control effect variable in magnitude; means responsive to the normal acceleration of said craft for operating said second source; comparing means connected to said first and second sources of control effect and operable upon a predetermined differential of said two control effects for rendering the first source ineffective and the second source effective to control said servo means.

12. Control apparatus for a dirigible craft having operable means for controlling craft pitch attitude, said apparatus comprising: servo means positioning said operable means to effect attitude changes and normal accelerations of said craft; a first source of control signal variable in magnitude normally controlling said servo means; and means responsive to the normal acceleration of said craft and normally disconnected from said servo means but adapted to be connected thereto for control thereof in response to a predetermined normal acceleration.

13. Control apparatus for an aircraft having operable means for controlling craft attitude about an axis thereof, said apparatus comprising: servo means positioning said operable means to effect attitude changes and normal accelerations of said craft; first means normally connected to said servo means to actuate said surface to change craft attitude; means operable by said servo means for developing an effect opposing said first means; normal acceleration means and switching means responsive to said first means and the normal acceleration means of said craft for disconnecting said first means and connecting said normal acceleration means to said servo means for control thereof.

14. Control apparatus for a condition having operable means for controlling said condition, comprising: servo means positioning said operable means; a first source of voltage control signal variable in magnitude normally controlling said servo means; a second source of variable voltage control signal; a servo mechanism having a time delay for operating said second source of voltage to vary the voltage therefrom; means for controlling simultaneously said servo mechanism and said second source of signal in accordance with the rate of change in the condition and a function of the operation of said servo means; and further means comparing said first and second signals and responsive to a predetermined differential of said two control voltage signals for rendering the first source ineffective and the second source effective to control said servo means.

15. Control apparatus for an aircraft having an elevator control surface for controlling craft attitude, said apparatus comprising: servo means positioning said surface; a first source of control signal voltage variable in magnitude normally controlling said servo means to effect attitude changes and normal accelerations of said aircraft; a second source of variable control voltage signal; means responsive to the normal acceleration of said craft for operating said second source; thermionic means connecting said first source of control signal voltage to said servo means for control thereof; means for connecting said first and second control voltage sources in opposed relation to said thermionic means whereby upon a predetermined differential in magnitude of said two voltage signals said first source of control voltage is disconnected from said servo means.

16. In condition control apparatus including an operable device for controlling said condition, in combination: motor means for operating said device; a control means connected to said motor means to control energization thereof; a first signal providing means normally operating said control means; means responsive to a magnitude of a condition of said apparatus due to operation of said operable device for developing a second signal selective means varying said second signal for a given magnitude of said condition; means for comparing said first and second signals and operable on a predetermined difference thereof for rendering one of the signal providing means ineffective on said control means.

17. In a condition control apparatus having an operable device for controlling said condition, in combination: servo means for operating said device; a control means connected to said servo means; a first source of signal normally operating said control means; means responsive to a reaction of said apparatus due to operation of said operable device for developing a second signal; means for comparing said two signals and operable in response to a predetermined difference thereof for rendering the first source of signal ineffective on said control means and rendering said second signal effective on said control means.

18. In attitude control apparatus for an aircraft whereby the craft may be controlled within a desired magnitude of normal acceleration, a first control circuit responsive to attitude and attitude rate change of the craft; a second control circuit responsive to the normal accelerations of the craft; means for comparing outputs of said two control circuits; and operable means connected to one or the other of said control circuits in accordance with the relative effects of said two control circuits on said comparing means.

19. In flight control apparatus for an aircraft whereby the craft may be controlled within a desired flight condition, a first control circuit having an output varying with the change of the desired and actual attitudes of the craft about an axis; a second control circuit having an output varying with the normal acceleration of the craft, indicating the relationship of craft flight to the desired flight condition, due to correcting such changes in craft attitude; and operable comparing means oppositely responsive to the outputs of the two control circuits.

20. In control apparatus having an operable device for controlling a condition of said apparatus, in combination: motor means for operating said device; a control means connected to said motor means to control energization thereof; a first signal providing means normally operating said control means; means responsive to a condition of said apparatus due to operation of said operable device for providing a second signal; means for comparing said first and second signals and operable on a predetermined difference thereof for rendering one or the other of the signal providing means ineffective on said control means.

21. An apparatus to be controlled and including an operable device for controlling a condition, in combination: motor means operating said device; a control means connected to said motor means to control energization thereof; a first signal providing means responsive to a change in one condition normally operating said control means; means responsive to a second condition of said apparatus due to operation of said operable device for developing a second control signal; means for comparing said first and second signals and effective on a predetermined difference between said signals for rendering one of the signal providing means ineffective and the other signal providing means effective on said control means.

22. An automatic control limiting arrangement for an aircraft comprising: control surface operating means; pitch steering signal means normally connected to said control surface operating means; normally disconnected reference signal means adapted to provide predetermined control signals; and normally deenergized acceleration signal responsive switching means connected to said control surface actuating means, to said pitch steering signal means, and to said reference signal means, said switch means being energized in response to predetermined values of acceleration signals to disconnect said actuating means from said pitch steering signal means and to connect said reference signal means to said actuating means; whereby when said predetermined values of acceleration signals occur said operating means is disconnected from said pitch steering signal means and connected to said reference signal means to receive selected polarities of said reference signals which are applied to said operating means.

References Cited in the file of this patent
UNITED STATES PATENTS

| | | |
|---|---|---|
| 2,487,793 | Esval et al. | Nov. 15, 1949 |
| 2,674,711 | MacCallum | Apr. 6, 1954 |
| 2,768,343 | Kutzler | Oct. 23, 1956 |
| 2,823,877 | Hess | Feb. 18, 1958 |
| 2,869,804 | Muinch et al. | Jan. 20, 1959 |